July 17, 1956     C. R. WYKOFF     2,754,887
METHOD OF MAKING A TUBELESS TIRE
Filed Dec. 24, 1953     2 Sheets-Sheet 1

INVENTOR.
CLYDE R. WYKOFF
BY W. A. Fraser
ATTY.

July 17, 1956 C. R. WYKOFF 2,754,887
METHOD OF MAKING A TUBELESS TIRE
Filed Dec. 24, 1953 2 Sheets-Sheet 2
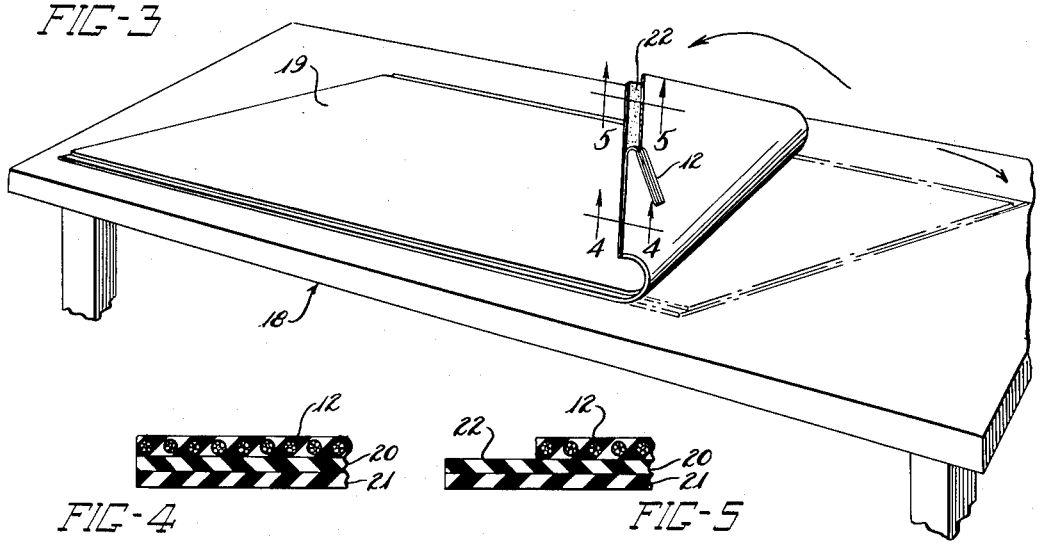
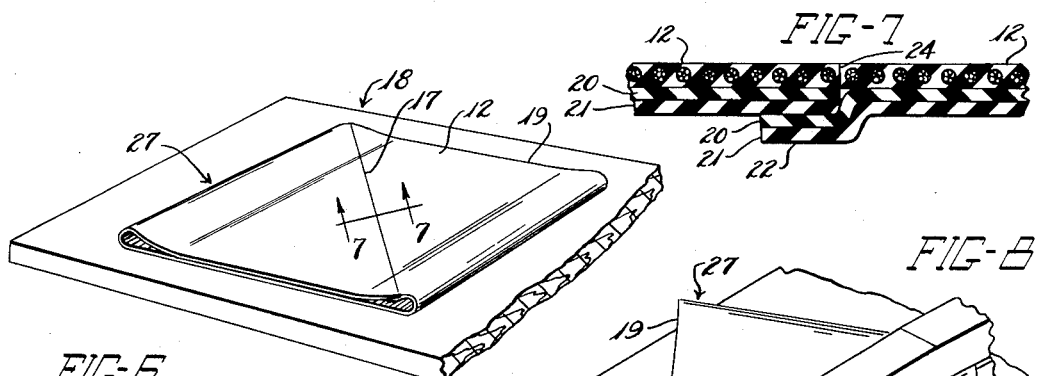
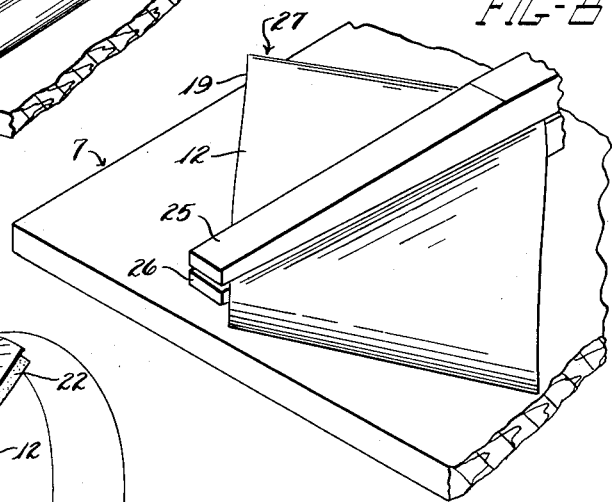
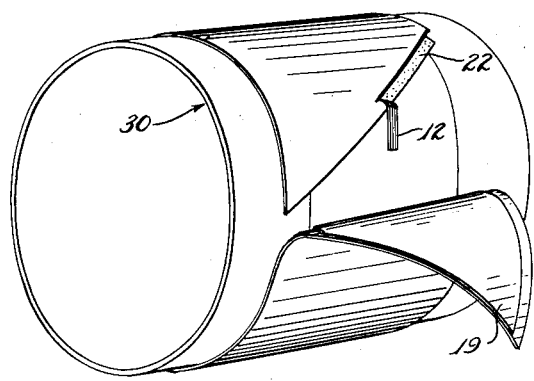
INVENTOR.
CLYDE R. WYKOFF
BY W. A. Fraser
ATTY.

United States Patent Office 2,754,887
Patented July 17, 1956

2,754,887

METHOD OF MAKING A TUBELESS TIRE

Clyde R. Wykoff, Akron, Ohio, assignor to The Firestone Tire & Rubber Company, Akron, Ohio, a corporation of Ohio Application December 24, 1953, Serial No. 400,305

2 Claims. (Cl. 154—14)

This invention relates to tubeless pneumatic tires of the open-beaded type and has as one of its principal objects the provision of a fluid tight splice of the inner layers of such tires.

Another object of the present invention is to provide such splice as referred to above which splice may be made properly and quickly by a workman of ordinary skill.

Another object of the present invention is to provide a splice of the inner layers of a tubeless tire which splice embodies a sufficient extent of lap of rubber only that it will be able ot absorb a certain amount of foreign material therein without permitting inflationary air of a tire to pass through the splice.

A further object of the present invention is to provide a splice or lap of the inner layers of a tubeless tire which is uniform in width.

A still further object of the present invention is to provide a splice of the first ply of rubberized cord tire fabric and an inside layer of air impervious rubber-like material covering said first ply on the inside of the tire which splice embodies a substantial lap of the ends of said rubber layer adjoining and beyond the meeting of the cords of the ends of said ply.

Yet another object of the inventoin is to splice the ends of the first ply of a tubeless cord tire without overlapping the cords in the ends of said ply or resorting to the use of rubber strips.

It is the general practice in the manufacture of tubeless tires of the open-beaded type, which are presently being sold commercially, to cover the inside surface of the tires with a layer of rubber-like material, for example, but without limitation, as butyl or other material having a high resistance to diffusion of air therethrough. It has been a serious problem in the employment of such inner layers on the first plies of said tires to make the necessary splices of said inner layer of rubber and the first ply without permitting the leakage of air through said splices. Resort to many expedients has been undertaken to make these splices air tight, but until the present invention such efforts have not been entirely satisfactory.

The above and other objects will be apparent from the following description, reference being had to the drawings in which:

Fig. 3 is a diagrammatic view showing an inside or first ply of rubberized cord fabric of the tire shown in Fig. 1 with a two-ply layer of butyl or rubber-like material applied thereto and illustrating the manner in which one or more cords are removed from the ply to provide an extension of said layer beyond the cords at one end of said ply;

Fig. 4 is an enlarged sectional view of the ply and layer taken on line 4—4 of Fig. 3;

Fig. 5 is an enlarged sectional view of the ply and layer taken on line 5—5 of Fig. 3;

Fig. 6 is a view illustrating the manner in which the inside ply and layer of rubber shown in Fig. 3 may be spliced by abutting the end cords of said first ply forming a band and lapping said extension of the inner layer of rubber over an abutting end of said ply;

Fig. 7 is an enlarged sectional view taken on line 7—7 of Fig. 6;

Fig. 8 is a diagrammatic view illustrating the manner in which the splice or lap shown in Fig. 6 is placed between arms of a pressing and heating device; and Fig. 9 is a perspective view of a tire building drum upon which said first ply and layer shown in Fig. 3 has been placed and shown with a plurality of cords partially torn from one end of the ply preparatory to splicing as shown in Fig. 3.

Figure 1:
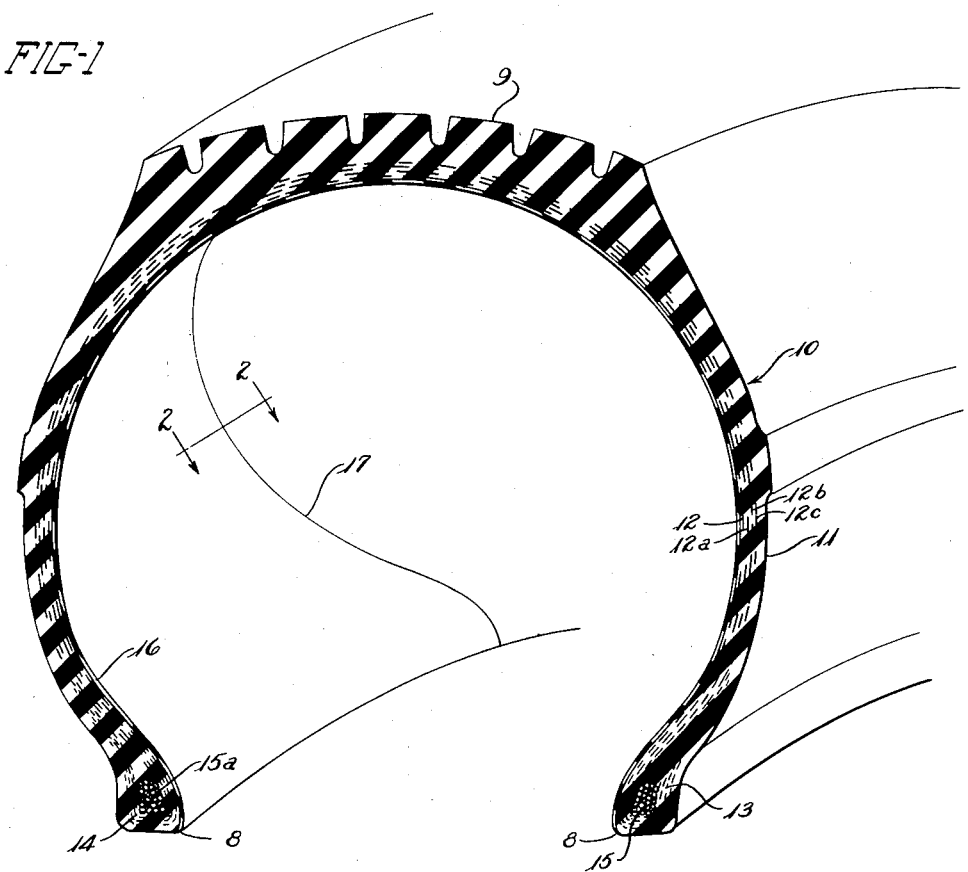
Fig. 1 is a fragmentary cross-sectional view in perspective of a tire construction in accordance with and embodying the invention.

Referring now to the drawings in detail and particularly to Fig. 1, it will be seen that the tire 10 is of the straight-side type and comprises a tread portion 9 and a body portion 11 which body portion may be of natural rubber reinforced with plies 12, 12a, 12b and 12c of any suitable material such as woven or weftless cord fabric of cotton, rayon, nylon, wire or the like. The plies are anchored at tire bead portions 13 and 14 to inextensible rings of bead wire 15, 15a respectively. The entire inner surface of said tire between the toes of the tire beads is covered with a layer 16 of butyl or other rubber-like material which is substantially impervious to air, said inner layer having splice 17 which extends from bead to bead of the tire in a path that follows the direction of the cords it overlies in said first ply.

Tire 10 may be built in the usual manner except for the inner or first ply and the layer of rubber impervious to air attached thereto. Said first ply is rubberized in any usual manner as by skim coating both sides with a rubber calender and then bias cutting strips to proper width. Next, a predetermined length of the coated fabric for the first ply is laid upon a table 18 (see Fig. 3), after which a layer 19 of butyl or rubber-like material impervious to air is laid over the center portion of said inner ply 12 leaving the distance between the edges of layer 19 and said first plies of approximately one inch for an 8.00–15 size tire. It is to be noted that layer 19 is composed of two plies 20 and 21 which, it is to be understood, are offset laterally a short distance to provide a stepped or thin edge to the composite strip 19. Preparatory to splicing the first ply on table 18, one end of the ply is lifted from the table and turned back by a workman and one or more cords are torn from the end of the ply as illustrated in Fig. 3, leaving a portion 22 of layer 19 extending beyond the end of first ply 12.

Next, after the complete removal of said cords, the ends of ply 12 are brought into contact and abutted as illustrated in Fig. 6, with the projection or extension 22 of layer 19 overlying layer 19 on the opposite end portion of ply 12 forming a joint and lap splice as illustrated in Fig. 7. By reference to Fig. 7, it will be seen that the ends of cord ply 12 are abutted without overlapping of the cords and that the projection 22 of layer 19 neatly overlies and seals the abutted joint 24 of the said first ply forming what is generally referred to in the industry as a band ply. It is to be noted that the abutting of the cord ply at joint 24 automatically regulates the width and direction of the lap of projection 22 over layer 19 in the splice. Since projection 22 is formed of relatively thin flexible rubber or the like and its lap is uniform, it will be seen that only slight pressure is needed to unite the surfaces of this splice. If the contact surfaces of the lap in the splice of layer 19 have the usual tack of unvulcanized rubber when it is being processed in a factory, only slight pressure may be required to unite said surfaces in the splice. If such tack or adhesive characteristic is not present, the expedient of making the surface tacky by the use of rubber solvents may be resorted to or if found desirable, rubber cement may be used in the splice. Applicant has found that such expedients are usually not necessary, but since uniformity of tackiness of rubber cannot be assured from day to day in the manufacture of rubber products, applicant has provided means for insuring a good union between the unvulcanized surfaces of layer 19 in the splice 17. To this end a pressure device having arms 25 and 26 are provided between which arms the band shown in Fig. 8 may be inserted so as to dispose the splice 17 between said arms after which said arms are pressed, by any mechanism found satisfactory, against said splice to insure the surfaces in said splice adhering firmly together until assembled in the tire and the rubber is subjected to vulcanization. It is to be understood that if desired, pressure arms 25 and 26 may embody heater units to subject the splice 17 to a softening heat or even a partial vulcanization. A table 7 may be disposed under said arms to partially support said first ply and layer 19.

The splice of ply 12 and layer 19 as just described forms a band ply 27 which which is applied to the conventional tire building drum in the usual manner employed in building drum-built tires, after which the adtional plies 12a, 12b and 12c, the tire beads and other elements of the tire are assembled in the usual manner tires are presently built.

Figure 2:
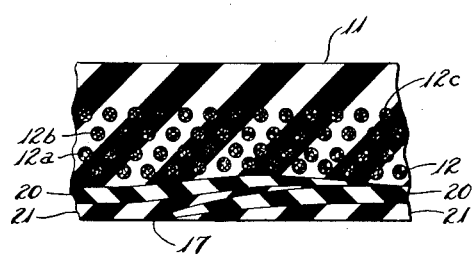
Fig. 2 is a fragmentary sectional view taken on line 2—2 of Fig. 1.

Preferably, layer 19 extends from the toes of the tire beads completely over the inside surface of the tire which is exposed to inflationary air, however, if layer 19 does not extend to the toes 8 of the tire beads, then the portions of ply 12 exposed to the inflationary air should be covered by a layer of material impervious to air. After the components of tire 10 have been assembled, the tire is removed from the building drum and molded and vulcanized in the usual manner, preferably by the use of a curing bag. If a curing bag is used, then the splice 17 will be molded to some extent as indicated in Fig. 2 whereby the permanent vulcanized union of the lap splice 17 is insured. It is to be understood, however, that applicant's splice described above insures fluid tightness in the event that tire 10 is molded and vulcanized with a fluid pressure medium in contact with the inside surface of the tire.

Fig. 9 illustrates diagrammatically the making of splice 17 on a tire building drum 30. It will be obvious to those familiar with tire building that the strip 19 shown in Fig. 3 could be placed about the tire building drum 30 as shown in Fig. 9 and the cords removed as illustrated after which the splice 17 may be made in the same manner as on table 18 except for pressing and heating of the splice between the pressure arms 25 and 26. The splice 17 will have the same structural features regardless of where it is assembled and it is to be understood that the detailed description of the particular embodiments of the invention illustrated and described herein are not to be construed as limiting the invention thereto. The invention includes all features of patentable novelty residing in the foregoing description and the accompanying drawings.

What is claimed is:

1. The method of making the inside plies of tubeless pneumatic cord fabric type tires impervious to tire inflationary air comprising, preparing a roll of cord tire fabric by coating same with rubber on a rubber calender; cutting strips, on the bias, of proper width, for inside plies, for said tires, from said calendered roll; calendering two strips of air-impervious rubbery material and superimposing said strips with their edges offset to form a composite strip; applying said composite strip in permanent relation to the center portion of one side of said bias-cut strip, said composite strip being placed the entire length of said bias strip with the edges of said composite strip spaced from the edges thereof; cutting proper lengths from the assembled bias strip and layer of impervious material for use as the inside plies of said tires; removing, by tearing, at least one cord from an end of said inside ply leaving an extension of the composite strip beyond the torn end of the cord fabric portion of the inner ply, butt splicing the ends of the torn fabric ply with the cords of the abutted ends parallel and lap splicing said composite strip on said first ply by lapping said extension thereof over the untorn end of said first cord fabric ply.

2. The method of making the inside plies of tubeless pneumatic cord fabric type tires impervious to tire inflationary air comprising, preparing a roll of cord tire fabric by coating same with rubber on a rubber calender; cutting tire ply strips of proper width, for inside plies, for said tires, from said roll; calendering a strip of air-impervious rubber material, applying said strip of rubbery material in permanent relation to the center portion of one side of said ply strip, said rubbery material strip being placed the entire length of said ply strip with the edges of said rubber material strip spaced from the edges thereof; cutting proper lengths from the assembled ply strip and strip of said rubbery material for use as the inside plies of said tires; removing at least one cord from an end of said inside ply leaving an extension of said rubbery material strip beyond the end of the cord fabric portion of the inner ply from which said cord or cords have been removed, splicing the ends of the fabric ply with the cords of the ends parallel and lap splicing said rubbery strip on said first ply by lapping said extension thereof over the other end of said first cord fabric ply.

References Cited in the file of this patent

UNITED STATES PATENTS

| | | |
|---|---|---|
| 2,431,035 | Geopfert et al. | Nov. 18, 1947 |
| 2,480,811 | McCoy | Aug. 30, 1949 |
| 2,501,644 | Kraft et al. | Mar. 21, 1950 |
| 2,541,550 | Sarbach et al. | Feb. 13, 1951 |
| 2,615,487 | Cunningham | Oct. 28, 1952 |
| 2,645,265 | O'Neil | July 14, 1953 |
| 2,676,637 | Frazier | Apr. 27, 1954 |
| 2,688,996 | Loomis | Sept. 14, 1954 |